Feb. 20, 1923.

J. L. BURNHAM

DYNAMO-ELECTRIC MACHINE

Filed July 19, 1920

Inventor:
Joseph L. Burnham,
by *Allen G. Davis*
His Attorney.

Patented Feb. 20, 1923.

1,445,933

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

DYNAMO-ELECTRIC MACHINE.

Application filed July 19, 1920. Serial No. 397,194.

*To all whom it may concern:*

Be it known that I, JOSEPH L. BURNHAM, a citizen of the United States, residing at Schenectady, county of Schenectady, State of New York, have invented certain new and useful Improvements in Dynamo-Electric Machines, of which the following is a specification.

My invention relates to dynamo electric machines and particularly to the poles of such machines, and has for its object a novel construction of poles in which the magnetic material not only carries the magnetic flux but also the exciting current.

Figure 1:
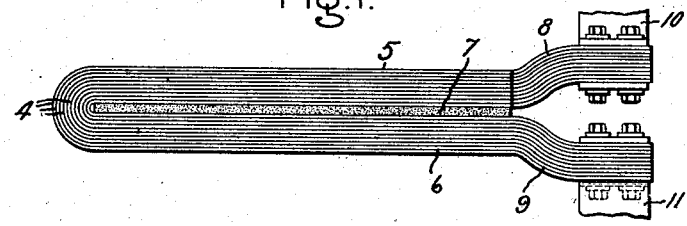
Figure 2:
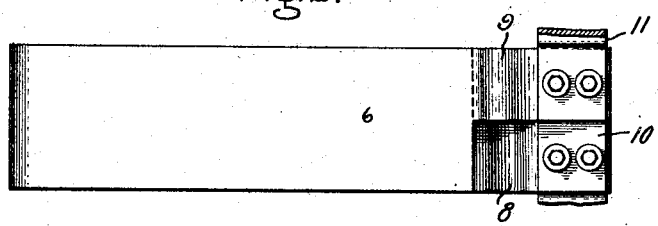

The features of novelty which characterize my invention are pointed out with particularity in the claims annexed to and forming a part of this specification. For a better understanding of my invention, however, reference may be had to the following description taken in connection with the accompanying drawing, in which Fig. 1 is a top view of a pole embodying my invention; Fig. 2 is a plan view of the pole of Fig. 1; and Fig. 3 is a diagrammatic view of a dynamo electric machine provided with the poles of Figs. 1 and 2.

Referring to the drawing, my pole comprises a loop of magnetic material in the form of laminations 4 of any desired thickness. One side 5 of the loop is separated from the other side 6 by means of insulation 7. The ends 8 and 9 of the loop are provided with electrical connections 10 and 11, whereby the current of the machine may be conducted through the loop of magnetic material, so that this magnetic material becomes a combined pole piece and winding. The loop in the magnetic material may be made in any desired way as by bending a straight piece into the desired shape, or by welding two pieces together.

In the particular construction shown in Figs. 1 and 2, the lower portion of one end of the loop is cut away and the upper portion of the other end of the loop is cut away, so that the electric connections 10 and 11 may be readily made and removed.

Figure 3:
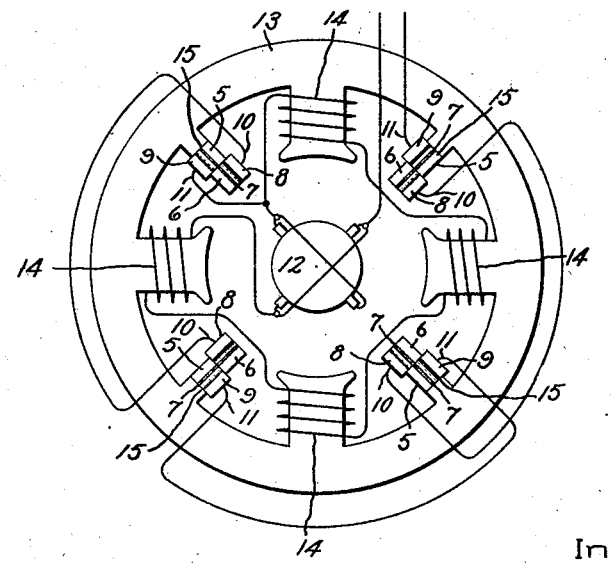

In Fig. 3 of the drawing, I have shown my invention applied to the commutating poles of a direct current dynamo electric machine. In this figure, 12 is the armature and 13 is the frame. The frame is provided with ordinary shunt wound poles 14 and commutating poles 15 constructed in accordance with my invention, and held in place by suitable means. The commutating poles are connected in series with each other and with the armature 12 so that the current of the machine passes through the poles.

Such a construction of poles as described herein is advantageous in reducing the amount of copper in a dynamo electric machine and also simplifies the pole construction, thus reducing the cost of the poles.

If it is desired to build poles in accordance with my invention having more than one turn, a plurality of loops may be provided, separated by insulation. Loops may be placed one above the other, or they may be placed one inside the other, the electrical connections of the ends of the loops being properly made. I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is,—

1. In a dynamo electric machine, a combined pole piece and winding comprising a member of magnetic material formed in a loop, the lower portion of one end of the loop being cut away and the upper portion of the other end of the loop being cut away, and means for making electrical connections to those portions of the ends of the loop which are not cut away.

2. In a dynamo electric machine, a combined pole piece and winding comprising a plurality of laminations of magnetic material formed in a loop, the lower portion of one end of the loop being cut away and the upper portion of the other end of the loop being cut away, and means for making electrical connections to those portions of the ends of the loops which are not cut away.

3. In a dynamo electric machine, a combined pole piece and winding comprising a member of magnetic material formed in a loop, insulating material separating the sides of said loop, the lower portion of one end of the loop being cut away and the upper portion of the other end of the loop being cut away, and means for making electrical connections to those portions of the ends of the loop which are not cut away.

4. In a dynamo electric machine, a combined pole piece and winding comprising a plurality of laminations of magnetic material formed in a loop, insulating material separating the sides of said loop, the lower portion of one end of the loop being cut away and the upper portion of the other end of the loop being cut away, and means for making electrical connections to those portions of the ends of the loop which are not cut away.

In witness whereof, I have hereunto set my hand this 16th day of July, 1920.

JOSEPH L. BURNHAM.